United States Patent
VanAntwerp et al.

(10) Patent No.: US 12,271,745 B1
(45) Date of Patent: Apr. 8, 2025

(54) METHOD AND SYSTEM FOR RECONCILING USER INTERACTIONS

(71) Applicant: STATE FARM MUTUAL AUTOMOBILE INSURANCE COMPANY, Bloomington, IL (US)

(72) Inventors: John M. VanAntwerp, Normal, IL (US); Dan Kalmes, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 12 days.

(21) Appl. No.: 16/001,629

(22) Filed: Jun. 6, 2018

Related U.S. Application Data

(60) Provisional application No. 62/535,613, filed on Jul. 21, 2017.

(51) Int. Cl.

| | | |
|---|---|---|
| G06F 9/451 | (2018.01) | |
| G06F 3/0481 | (2022.01) | |
| G06F 3/0484 | (2022.01) | |
| G06F 3/04847 | (2022.01) | |
| G06F 8/34 | (2018.01) | |
| G06F 8/36 | (2018.01) | |
| G06Q 10/06 | (2023.01) | |

(52) U.S. Cl.
CPC ............ *G06F 9/452* (2018.02); *G06F 3/0481* (2013.01); *G06F 3/0484* (2013.01); *G06F 3/04847* (2013.01); *G06F 8/34* (2013.01); *G06F 8/36* (2013.01); *G06F 9/451* (2018.02); *G06Q 10/06* (2013.01)

(58) Field of Classification Search
CPC .... G06F 3/0484; G06F 3/04847; G06F 9/451; G06F 8/34; G06F 8/36; G06Q 10/06
See application file for complete search history.

(56) References Cited

U.S. PATENT DOCUMENTS

| | | | | |
|---|---|---|---|---|
| 5,640,501 A | * | 6/1997 | Turpin | G06F 8/34 |
| | | | | 715/224 |
| 6,314,415 B1 | * | 11/2001 | Mukherjee | G06F 40/174 |
| | | | | 706/47 |
| 7,752,092 B1 | * | 7/2010 | Mattice | G06Q 40/123 |
| | | | | 705/30 |
| 7,818,341 B2 | | 10/2010 | Kurien et al. | |
| 8,533,584 B2 | * | 9/2013 | Dittmar | G06Q 30/02 |
| | | | | 715/201 |

(Continued)

OTHER PUBLICATIONS

Non Final Office Action dated Jan. 24, 2020 for U.S. Appl. No. 16/001,571 "Method and System for Administering Dynamic User Experience Applications" VanAntwerp, 9 pages.

(Continued)

*Primary Examiner* — William L Bashore
*Assistant Examiner* — Sajeda Muhebbullah
(74) *Attorney, Agent, or Firm* — Lee & Hayes, P.C.

(57) ABSTRACT

Systems and methods may be provided for providing dynamic user experience (UX) applications that may reduce burden upon application users by allowing querying and sharing of user information across multiple application interactions associated with a user. Furthermore, the systems and methods herein may provide security restrictions that protect potentially sensitive user information from erroneous user authentication.

20 Claims, 7 Drawing Sheets

"Completed" Interaction Record A - Credit Card Application

| | |
|---|---|
| User | jDoe61 |
| Workflow State | Credit01.7 |
| Device/Session | |
| Behavior(s) | |

| Parameter | Value | Time | Source | Class | LOA |
|---|---|---|---|---|---|
| Full Name | Jonathan Doe | 11/20/2017 8:31 | Credit01.1 | 1 | 1 |
| Address | 123 Main Street | 11/22/2017 14:58 | Credit01.3 | 2 | 2 |
| DOB | 8/3/1961 | 11/22/2017 14:59 | Credit01.3 | 2 | 3 |
| Credit Score | 724 | 12/1/2017 6:45 | External Service | 1 | 3 |
| Occupation | Student | 11/26/2017 18:22 | Credit01.2 | 1 | 2 |
| Social Security # | 555-55-5555 | 11/28/2017 9:17 | Credit1.6 | 1 | 4 |

(56) References Cited

U.S. PATENT DOCUMENTS

| | | |
|---|---|---|
| 9,086,914 B2 | 7/2015 | Bolohan et al. |
| 10,979,539 B1 | 4/2021 | VanAntwerp et al. |
| 11,069,001 B1 | 7/2021 | Mascaro et al. |
| 11,601,529 B1 | 3/2023 | VanAntwerp et al. |
| 11,936,760 B2 | 3/2024 | VanAntwerp et al. |
| 2002/0161911 A1 | 10/2002 | Pinckney, III et al. |
| 2004/0015578 A1 | 1/2004 | Karakashian et al. |
| 2004/0163037 A1 | 8/2004 | Friedman et al. |
| 2004/0230636 A1 | 11/2004 | Masuoka et al. |
| 2006/0005140 A1 | 1/2006 | Crew et al. |
| 2006/0069605 A1 | 3/2006 | Hatoun |
| 2006/0074735 A1 | 4/2006 | Shukla et al. |
| 2006/0161272 A1 | 7/2006 | Haller et al. |
| 2007/0271521 A1 | 11/2007 | Harriger et al. |
| 2008/0077530 A1 | 3/2008 | Banas et al. |
| 2008/0154935 A1 | 6/2008 | Draeger et al. |
| 2011/0004590 A1 | 1/2011 | Lilley et al. |
| 2011/0282941 A1* | 11/2011 | Chan ................ G06Q 10/06 709/204 |
| 2012/0303756 A1 | 11/2012 | Bolohan et al. |
| 2013/0036367 A1 | 2/2013 | DeRoos et al. |
| 2013/0152001 A1 | 6/2013 | Lovitt et al. |
| 2013/0158964 A1 | 6/2013 | Hall et al. |
| 2013/0159228 A1 | 6/2013 | Meijer et al. |
| 2013/0173719 A1 | 7/2013 | Ahmed et al. |
| 2014/0047028 A1 | 2/2014 | Buth |
| 2014/0122497 A1* | 5/2014 | Eigner ................ G06F 21/60 707/740 |
| 2014/0229898 A1 | 8/2014 | Terwedo |
| 2014/0258336 A1* | 9/2014 | Scott ............... G06F 21/6227 707/E17.014 |
| 2015/0074615 A1* | 3/2015 | Han ................ G06K 9/00033 715/863 |
| 2016/0132696 A1* | 5/2016 | Vidhani ............... G06Q 30/00 726/28 |
| 2016/0147729 A1 | 5/2016 | Sivertson et al. |
| 2016/0147828 A1 | 5/2016 | Yu et al. |
| 2016/0259534 A1 | 9/2016 | Simons et al. |
| 2016/0275627 A1 | 9/2016 | Wang et al. |
| 2016/0283889 A1 | 9/2016 | Shukla et al. |
| 2017/0039046 A1 | 2/2017 | Henke et al. |
| 2017/0132200 A1 | 5/2017 | Noland et al. |
| 2017/0161855 A1* | 6/2017 | Schreyer ............ G06Q 50/167 |
| 2017/0220963 A1 | 8/2017 | Canaran et al. |
| 2017/0264566 A1 | 9/2017 | Namboodiri et al. |
| 2017/0315782 A1 | 11/2017 | Chaudhry et al. |
| 2017/0315789 A1 | 11/2017 | Lam et al. |
| 2017/0316363 A1 | 11/2017 | Siciliano et al. |
| 2017/0322782 A1 | 11/2017 | Pakiman et al. |
| 2017/0344895 A1 | 11/2017 | Roy |
| 2017/0357627 A1* | 12/2017 | Peterson ............ G06F 40/174 |
| 2018/0108093 A1 | 4/2018 | Podgorny et al. |
| 2018/0210619 A1 | 7/2018 | Mowatt et al. |
| 2018/0321830 A1 | 11/2018 | Calhoun |
| 2019/0355351 A1 | 11/2019 | Kim et al. |
| 2022/0286531 A1 | 9/2022 | VanAntwerp et al. |
| 2023/0141866 A1 | 5/2023 | VanAntwerp |
| 2023/0208943 A1 | 6/2023 | VanAntwerp |
| 2024/0223679 A1 | 7/2024 | VanAntwerp et al. |

OTHER PUBLICATIONS

"Common SMS Problems and How to Solve Them, Part 1", Laura Schaffer, Twilio Blog, https://www.twilio.com/blog/2015/08/common-sms-problems-and-how-to-solve-them-part-1.html, Aug. 21, 2015.

Final Office Action dated Mar. 4, 2020 for U.S. Appl. No. 16/001,602 "Method and System for Optimizing Dynamic User Experience Applications" VanAntwerp, 19 pages.

Non Final Office Action dated May 29, 2020 for U.S. Appl. No. 16/001,643 "Method and System of Generating Generic Protocol Handlers" VanAntwerp, 12 pages.

Final Office Action dated Aug. 6, 2020 for U.S. Appl. No. 16/001,571, "Method and System for Administering Dynamic User Experience Applications", VanAntwerp, 20 pages.

Office Action dated Feb. 22, 2021 for U.S. Appl. No. 16/001,571, "Method and System for Administering Dynamic User Experience Applications", VanAntwerp, 11pages.

Office Action dated Mar. 2, 2021 for U.S. Appl. No. 16/001,602 "Method and System for Optimizing Dynamic User Experience Applications" VanAntwerp, 20 pages.

Office Action for U.S. Appl. No. 16/001,602, mailed on Sep. 2, 2021, VanAntwerp, "Method and System for Optimizing Dynamic User Experience Applications", 25 pages.

Office Action for U.S. Appl. No. 16/001,571, mailed Aug. 31, 2021, Kalmes, "Method and System for Administering Dynamic User Experience Applications", 11 pages.

Herbst, et al., "Integrating Machine Learning and Workflow Management to Support Acquisition and Adaption of Workflow Models", retrieved Dec. 2021, at <<https://onlinelibrary.wiley.com/doi/pdf>>, 2000, pp. 67-92.

Office Action for U.S. Appl. No. 16/001,571, mailed on Dec. 21, 2021, VanAntwerp, "Method and System for Administering Dynamic User Experience Applications", 12 pages.

Office Action for U.S. Appl. No. 17/222,221, mailed on Jun. 30, 2022, VanAntwerp, "Method and System of Generating Generic Protocol Handlers", 6 pages.

Office Action for U.S. Appl. No. 16/001,571, mailed on Jul. 21, 2022, VanAntwerp, "Method and System for Administering Dynamic User Experience Applications", 13 pages.

Office Action for U.S. Appl. No. 17/750,554, mailed on Apr. 25, 2023, VanAntwerp, "Method and System for Generating Dynamic User Experience Applications", 21 pages.

Office Action for U.S. Appl. No. 16/001,571, mailed on Jan. 3, 2023, VanAntwerp, "Method and System for Administering Dynamic User Experience Applications", 12 pages.

Office Action for U.S. Appl. No. 16/001,571, mailed on Aug. 2, 2023, VanAntwerp, "Method and System for Administering Dynamic User Experience Applications", 15 pages.

Office Action for U.S. Appl. No. 16/001,571, mailed on Dec. 8, 2023, John M. VanAntwerp, "Method and System for Administering Dynamic User Experience Applications", 14 pages.

Office Action for U.S. Appl. No. 18/608,422, Dated Sep. 23, 2024, VanAntwerp, "Method and System of Generating Generic Protocol Handlers", 6 pages.

* cited by examiner

| "Completed" Interaction Record A - Credit Card Application | | | | | |
|---|---|---|---|---|---|
| User | | | jDoe61 | | |
| Workflow State | | | Credit01.7 | | |
| Device/Session | | | | | |
| Behavior(s) | | | | | |
| Parameter | Value | Time | Source | Class | LOA |
| Full Name | Jonathan Doe | 11/20/2017 8:31 | Credit01.1 | 1 | 1 |
| Address | 123 Main Street | 11/22/2017 14:58 | Credit01.3 | 2 | 2 |
| DOB | 8/3/1961 | 11/22/2017 14:59 | Credit01.3 | 2 | 3 |
| Credit Score | 724 | 12/1/2017 6:45 | External Service | 1 | 3 |
| Occupation | Student | 11/26/2017 18:22 | Credit01.2 | 1 | 2 |
| Social Security # | 555-55-5555 | 11/28/2017 9:17 | Credit1.6 | 1 | 4 |

FIG. 3A

"Active" Interaction Record B - Auto Insurance Application

| User | jDoe61 |
|---|---|
| Workflow State | Auto02.4 |
| Device/Session | |
| Behavior(s) | |

| Parameter | Value | Time | Source | Class | LOA |
|---|---|---|---|---|---|
| Full Name | Johnathan Doe | 11/20/2017 8:31 | Credit01.1 | 1 | 1 |
| Address | 123 Main Street | 11/22/2017 14:58 | Credit01.3 | 2 | 2 |
| DOB | - | - | - | 2 | 3 |
| Previous Provider | - | - | - | 4 | 3 |
| Credit Score | - | - | - | 3 | 3 |
| Social Security # | - | - | - | 4 | 4 |

FIG. 3B

FIG. 4B
FIG. 4A

METHOD AND SYSTEM FOR RECONCILING USER INTERACTIONS

CROSS REFERENCE TO RELATED APPLICATIONS

This application claims the benefit of U.S. Provisional Application 62/535,613, filed Jul. 21, 2017 and entitled "Method and System for Generating Dynamic User Experience Applications." The entire content of this application is incorporated herein by reference in its entirety.

FIELD OF THE DISCLOSURE

The present disclosure generally relates to application engines for building computer-implemented applications, and more specifically, to techniques for reconciling user interactions across applications and across application execution paths.

BACKGROUND

Typically, an organization may offer a number of computer implemented applications (e.g., web applications, mobile applications, and/or desktop software applications) via which users (e.g., the organization's customers, clients, and/or employees) may interact with the organization and its offered services and/or products. For example, the organization may be a financial services entity, and may offer an application via which a user may apply for a credit card, mortgage, or another financial product. Generally, such an application may include one or more user interfaces (UI) deliverable to a client device (e.g., smartphone, desktop, or laptop computer) of a user, and the user may utilize the UI to, for example, provide elements of personal information that may be prerequisite to acquiring the product or service.

With regard to applications, it is important for the organization to provide a satisfactory and consistent user experience (UX) for the users within one application, and/or across multiple applications offered by the organization. In this context, "user experience" may generally refer to the systems and methods via which one or more users may interact with an application, and the UX may include one or more user interfaces (UI, e.g., web form, audio interface, SMS interface, etc.) via which the application may present information to users and/or receive user input to engage with a product or service. Techniques for generating and delivering applications (and consequently, the applications themselves) may be affected by a number of challenges that may negatively affect UX for users of one or more applications offered by the organization.

Redundancy of interaction may negatively impact user experience for a user of one or more applications offered by the organization. Conventionally, communications between the user and the organization may span across a variety of between an organization and a user of one or more applications may span across a variety of stateful and/or stateless communications protocols (e.g., HTTP, SMS text, etc.). When a user provides information via multiple applications, multiple application sessions, or across multiple communication protocols, a user may often be required to redundantly self-identify, provide information, verify information, etc., thus potentially negatively impacting the user experience and reducing further engagement with applications.

BRIEF SUMMARY

The present embodiments may generally relate to techniques for generating dynamic user experience (UX) applications, the techniques allowing an organization to easily modify application execution paths and share user information in a way that is both conducive to both the user experience and information security.

At a high level application may be associated with an application execution workflow or "path" (e.g., a process of applying for a credit card) requiring interaction between a system hosting the application and a user of a client device (or "user device") accessing the application to acquire a product or service. The workflow may correspond to a plurality of discrete "steps" (e.g., a step of providing/obtaining a particular element of information, a step for verifying information, a step for acknowledging a privacy notice, and/or other steps), and may be associated with an "interaction" between the application user. Each step may correspond to one or more information parameters (e.g., name, address, verification of birthdate, acceptance of a privacy notice, etc.) that the application may need to receive to complete the step. To complete the step, the application may provide, to the client device, an "application component" (e.g., a user interface element such as a web form or SMS message), and the user may interact with the component (e.g., enter information in a web form, or respond via an SMS message) to provide information elements responsive to the needed parameters.

To reduce redundancy of interactions between a dynamic user experience application and a user, the techniques herein provide a "system of interaction" via which the a dynamic user experience application may (i) store information associated with a current interaction, and (ii) query and update other interactions associated with the same user (e.g., interactions the user's use of other applications, completion of other workflows, and/or other service calls) to make additional user information available to an active workflow.

Each parameter within a step may be associated with a "canonical data type" that may be constant across steps, workflows, and applications, thus enabling the system of interaction to locate and return information compatible with an active workflow. For example, a birthdate of a user may be stored in constant data format (e.g., a "MM/DD/YYYY" string) consistent across all steps, workflows, and applications.

To ensure security of retrieved information, the system of interaction may apply and observe "classifications" of parameters that may guide (i) whether the parameter can be securely shared across interactions, (ii) whether the user has permitted the information to be shared across interactions, and/or (iii) whether adequate user-side authentication has occurred for the user to view the parameter retrieved from another interaction.

Thus, the system of interaction may provide user information that would otherwise require potentially redundant actions from the user of an active application. Based upon information received via the system of interaction, a workflow may be modified, for example by (i) advancing the workflow to another step, or (ii) modifying an application component to be provided to a user device. By reducing burden upon application users, the techniques herein may improve engagement and retention rates of applications and the products/services the applications may offer.

In one embodiment computer-implemented method may be provided. The method may include (1) identifying, via a remote computing system, a current step of a first application execution path associated with execution of a dynamic UX application at a user device, (2) identifying, via the remote computing system, one or more step parameters associated with the current step, (3) locating, via the remote computing system, a first stored entry including one or more stored parameters corresponding to the user and to at least one of the one or more step parameters, wherein the first stored entry is associated with a second application execution path independent of the first application execution path, (4) modifying, via the remote computing system, the first application execution path, based upon the one or more stored parameters, and/or (5) providing, via the remote computing system, one or more application components to the user device, wherein the one or more components are associated with the current step and the modified first application execution path. The method may include additional, fewer, or alternate actions, including those described herein.

In another embodiment, a computing system may be provided. The computing system may include (1) one or more processors, and (2) one or more memories storing computer-executable instructions that, when executed by the one or more processors, cause the computing system to (i) identify a current step of a first application execution path associated with execution of a dynamic UX application at a user device; (ii) identify one or more step parameters associated with the current step; (iii) locate a first stored entry including one or more stored parameters corresponding to the user and to at least one of the one or more step parameters, wherein the first stored entry is associated with a second application execution path independent of the first application execution path; (iv) modify the first application execution path, based upon the one or more stored parameters; and/or (v) provide one or more application components to the user device, wherein the one or more components are associated with the current step and the modified first application execution path. The system may include additional, fewer, or alternate components, or may be configured to perform other actions, including those described herein.

In yet another embodiment, a non-transitory computer readable medium may be provided. The non-transitory computer readable medium may contain program instructions that, when executed, cause a computer to (1) identify a current step of a first application execution path associated with execution of a dynamic UX application at a user device, (2) identify one or more step parameters associated with the current step, (3) locate a first stored entry including one or more stored parameters corresponding to the user and to at least one of the one or more step parameters, wherein the first stored entry is associated with a second application execution path independent of the first application execution path, (4) modify the first application execution path, based upon the one or more stored parameters, and/or (5) provide one or more application components to the user device, wherein the one or more components are associated with the current step and the modified first application execution path. The non-transitory computer readable medium may contain additional, fewer, or alternate instructions, including those described herein.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIGS. 3A and 3B depict example interaction records that may be stored, queried, and retrieved from a system of interaction, in accordance with some embodiments;

FIGS. 4A and 4B depict example application components that may be provided to a client device based upon step parameters located via a system of interaction, in accordance with some embodiments;

DETAILED DESCRIPTION

I. Overview

Figure 1:
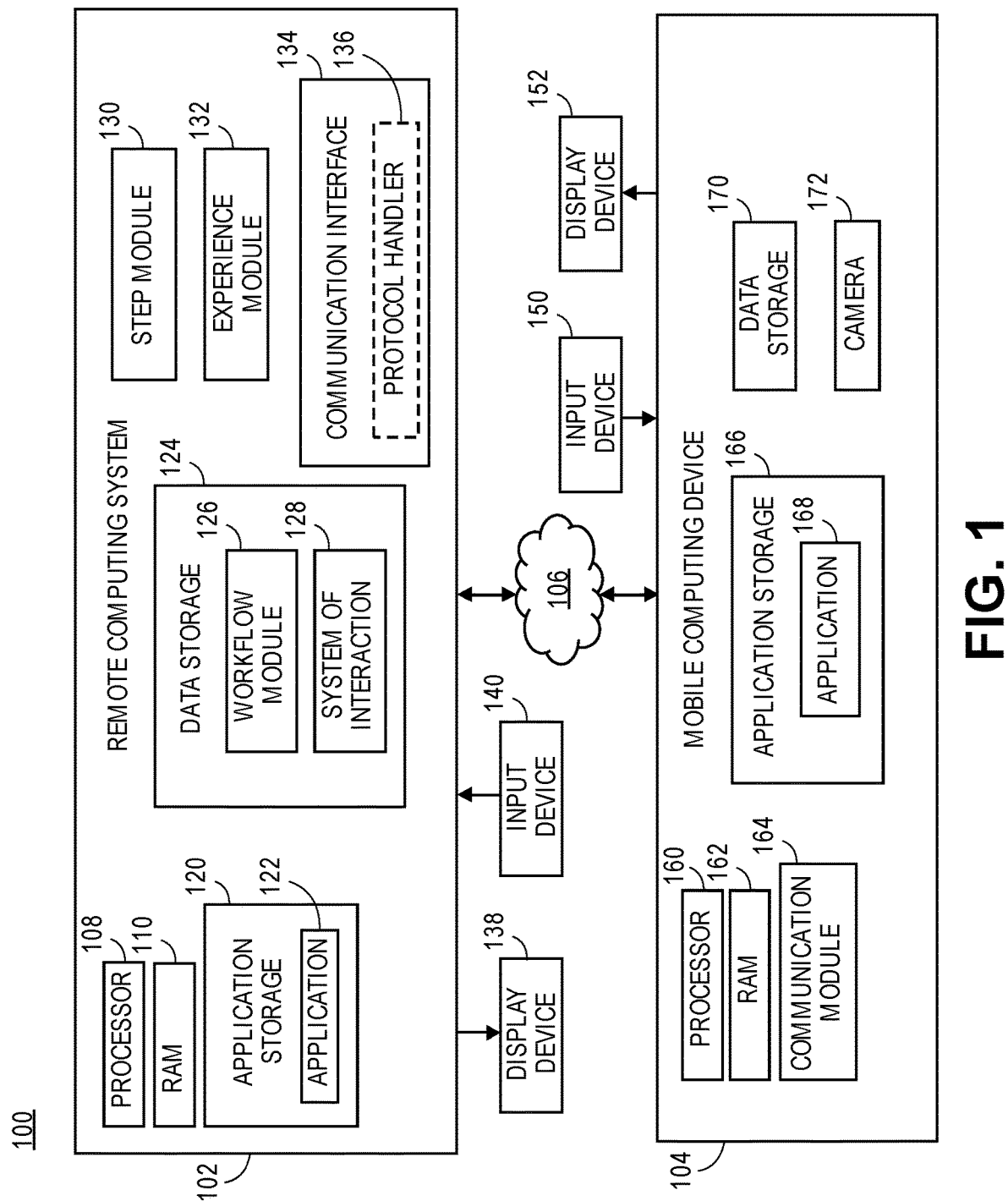
FIG. 1 depicts an example environment for generating dynamic UX applications, in accordance with some embodiments.

The embodiments described herein relate to, inter alia, generating and modifying ("optimizing") computer-implemented "dynamic user experience (UX) applications" are agile, personalized, quickly delivered to users, and capable of being seamlessly integrated across an organization (e.g., a large business entity). Techniques may be used to generate a dynamic UX application to carry out a business process organized into a workflow (or "path," which may be used interchangeably herein) comprising a series of steps. Further, techniques may be used to dynamically modify the behavior and functionality of an application, including while the application is installed or running in a client computing device, without requiring redeployment of the application to the client users. Furthermore, techniques may be used to query, retrieve, and/or reconcile user information provided across multiple interactions associated with a user, which may include user information provided via a plurality of applications, workflows, and steps.

A workflow may refer to a portion of a business process that requires interaction via a user (e.g., collection of data, approval or verification of information presented to the user, etc.). For example, an application may be provided for applying for a credit card, with the credit card application corresponding to a workflow (i.e., one or more workflows) that includes one or more steps. An application workflow may, for instance, include a step for collecting one or more elements of personal information (e.g., home address, date of birth, etc.) from the user. Accordingly, steps may be associated with one or more parameters (e.g., "home address" or "date of birth"), each of which may be associated with a canonical data type that allows for consistency across steps, workflows, and applications. Via the techniques described herein, workflows may be reused across applications, and steps may be reused across workflows and applications. For example, the same organization offering the credit card application may additionally offer an auto insurance application, which may similarly require personal information, such as name and home address, from a user of the application, and thus workflows of each application may share one or more steps.

A client application may be provided to the client computing device ("client device," "user device," as used interchangeably herein, e.g., laptop, desktop, server, smartphone, wearable device, etc.) of a user, allowing the client device to construct a dynamic UX application, for example by accessing a remote computing device (e.g., one or more servers), by transmitting messages to and/or receiving messages from the remote computing device.

The remote computing device may include a path management application or workflow manager application configured to create, store, modify, and/or deliver workflows (or "paths," which may be used interchangeably herein), steps comprising the workflows, and/or other rules defining how paths and steps are displayed at the client device. Workflows and steps may be arranged hierarchically, wherein steps may include sub steps or workflows may include sub-flows, for instance. Steps may be associated with "dependencies" defining other steps prerequisite to performing the step. A dependency associated with a step may be defined particular to a workflow (e.g., workflow X requires completion of step Y before execution of step Z) or may be general to the step itself (e.g., business practice, jurisdictional law, and/or logical reasoning requires a completion of a step Y before step Z). Additionally or alternatively, a step or workflow may be associated with other metadata (e.g., indicating steps that may be "optional" within one or more workflows). Furthermore, the path management application may create and/or modify "canonical" resources and/or data types that are capable of being commonly used across applications, allowing for consistent development and maintenance of APIs across separate applications offered by the organization for separate business objectives, and allowing for consistent records of interactions associated with users and workflows.

Each step may be associated with a plurality of user interface components ("components"), wherein each component may be equally and independently deliverable a client device of the user to enable completion of the step. For example, a step for acquiring the user's home address may associated with (i) a first component in the form of a web page/form deliverable to the client device, via which the user may provide the user's home address via text input; (ii) a second component in the form of an SMS text deliverable to a smartphone of the user to request (and receive via SMS reply) the user's home address; and (iii) a third component associated with a voice input (e.g., prompted via a web page, or requested in a voice call to the user's phone), via which the user may utilize a microphone in the client device to provide the user's home address.

Upon execution of a workflow, the workflow manager may manage state information associated with the workflow, including a "current step pointer" that may track the step within the workflow that the user is in the process of completing. State of an executing workflow may be associated in "interaction" records associated with workflows and users. In some embodiments, a user may be associated with a list of step progresses, wherein each step progress corresponds to the user's progress in the respective step. In execution of a step, an experience manager at the remote computing device may communicate with the workflow manager to identify a current step and determine, from components associated with the current step, which component to deliver to the client device. The determination of the component may be based, for example, upon learned information associated with the user.

At any point in an active workflow, the workflow manager may access a "system of interaction" that may store an interaction record associated with the active workflow. Furthermore, the system of interaction may store interaction records associated with other applications, and/or workflows, with the interaction records defining conditions upon which information can be shared to across interactions (i.e., shared to an active workflow). Based upon retrieved interaction records, the workflow manager may, for example, modify an application component to reflect a user information parameter already available to the system (e.g., by pre-populating a field in a web form), or advance the workflow to another step, based upon some or all parameters associated with the step already being available to the system.

Via the systems and methods herein, redundancy of interaction between a user and one or more applications may be reduced. For example, if a credit card application requires a user to supply the user's home address, the system of interaction may determine that the user's home address is already available from another interaction by the same user, and may supply the home address to the workflow manager. Furthermore, by applying a variety of limitations to sharing of information across interactions, the systems and methods provide security to potentially personal information associated with application users.

Example Environment for Implementing Dynamic UX Applications

FIG. 1 depicts an example environment 100 in which dynamic user experience (UX) applications may be generated and delivered according to some embodiments. The environment 100 includes various server-side components and client-side (i.e., user-side) components. Generally environment 100 may include a remote computing system 102 (comprising one or more servers, for instance) that may be communicatively coupled to one or more mobile computing devices 104 (also referred to herein as "client device," or "user device," e.g., laptop computer, smartphone, tablet, or other non-mobile computing devices such as a desktop computer or landline telephone) associated with (e.g., owned/operated by) one or more application users. The remote computing system 102 and client device 104 may be communicatively coupled via a network (i.e., one or more networks 106). The network 106 may include multiple communication networks of one or more types (e.g., one or more wired and/or wireless local area networks (LANs), wide area networks (WANs) such as the Internet, cellular communications networks, etc.). The precise arrangement of the components described herein may differ from that depicted in FIG. 1, in some embodiments.

The remote computing system 102 may be deployed as a single server device or multiple server devices, and accordingly may be referred to herein as "server device 102," or more simply "server 102." In embodiments comprising multiple server devices, each server may be representative of a particular business API or service, and the multiple servers may provide benefits including isolation of business APIs, isolation of production and testing environments, and stability. Additionally or alternatively, the remote computing system may include a server housing multiple business APIs in a platform-as-a-service (PaaS) model, which may provide benefits including seamless sharing of resources between business APIs, as well faster implementation/propagation of changes to APIs and shared resources.

The client computing device ("client device," i.e., one or more devices) 104 may be any suitable device or combination of devices (e.g., desktop computer, laptop computer, smartphone, notebook, tablet, etc.) running any suitable operating system for performing the functions of the client device 104 described herein.

The server device 102 may include a processor (i.e., one or more processors), an RAM (i.e., one or more RAM) 110, and an application/program storage (e.g., one or more persistent (non-transitory) memories) 120 including one or more applications 122, which may include software instructions (e.g., a web stack, Android package, etc.). The processor 108 may include any suitable number of processors of one or more suitable types (e.g., one or more central processing units (CPUs), graphics processing units (GPUs), etc.). Generally, the processor 108 may be configured to execute software instructions stored in one or more memories (e.g., stored in a persistent memory such as a hard drive or solid state memory) of server device 102. The RAM 110 may include solid state and/or transient memory and may store the application(s) 120, including instructions (e.g., corresponding to application(s) 122). When the processor 108 executes instructions corresponding to the application 122, the RAM 110 may, for example, temporarily store the instructions and data required for execution of the application 122. The processor 108 may load instructions stored in the application storage 120 or any other location into the RAM 110. Software instructions, when executed by the processor 108, may generate, create, and/or execute one or more dynamic UX applications, which may be loaded into the RAM 110 and/or the application storage 120.

The server device 102 may also include a display device (i.e., one or more display devices) 138 and an input device (i.e., one or more input devices) 140. Input device(s) 140 may include components that are integral to the server device 102, and/or exterior components that are communicatively coupled to the server device 102, to enable the server device 102 to read/retrieve inputs from the user via the input device 140. For example, the input device 140 may include a mouse, a keyboard, a trackball device, a microphone, scanner, etc. The display device 138 may also be either integral or external to the server device 102, and may use any suitable display technology (e.g., LED, OLED, LCD, etc.). In some embodiments, the input device 140 and the display device 138 may be integrated, such as in a touchscreen visual display. Generally, the input device 140 and the display device 138 may combine to enable a user to interact with user interfaces provided by server 102, for example, to perform server-side generation, modification, and other management of applications, workflows, steps, components, and user interactions described herein.

Generally, the server device 102 may operate to generate and modify dynamic UX applications, and further to deliver the applications to the client device 104 and process user requests (or "queries") generated by the applications in response to user interaction with the applications. Portions of the dynamic UX applications (e.g., UX components) generated/delivered by the server device 102 may be displayed for interaction at the client device 104, for example via a client input device (i.e., one or more input devices) 150 and/or a client display device (i.e., one or more display devices) 152. The server device 102 may perform these functions via the application 122, which may, for example, provide code and data (e.g., a dynamic UX application) to the client device 104. Code and data may include a fully-formed dynamic UX application, or requests/queries used to construct, modify, and/or view a dynamic UX application or portions of a dynamic UX application displayed in the client device 104. For example, server device 102 may generate web pages (e.g., Hypertext Markup Language (HTML) instructions, JavaScript instructions, Java Server Pages (JSP) instructions, mobile device application, and/or any other type of instructions suitable for defining the content and presentation of the code and data), and/or may include instructions of a plug-in, extension, and/or stand-alone software component that may be downloaded by client device 104.

Generally, the server device 102 may provide users accessing the application 122 with one or more user interfaces which may enable the user to interact with the application 122, and which in turn, may modify data associated with the server device 102. To that end, the server device 102 may transmit to the client device 104 user interface (UI) components (e.g., style sheets, executable code, HTML or JavaScript widgets, etc.), which the client device 104 may execute, and with which the user of the client device 104 may interact. The client device 104 may transmit data back to the server device 102 in the form of requests/queries, which may include data payloads.

The server device 102 may additionally include data storage 124, a workflow module 126, a system of interaction 128, a step module 130, and/or an experience module 132. Furthermore, the server device 102 may include a communication interface 134, which may include one or more protocol handlers 136 that enable cause information to be transmitted between the server device 102 and client device 104 by performing translation, formatting, and other processing on the information to be transmitted.

The data storage 124 may be composed of any suitable persistent or transient memory (e.g., a hard drive, random-access memory unit, etc.), and may store any number of modules including, without limitation, those depicted in FIG. 1. The data storage 124 may include an electronic database (e.g. a relational database, key-value store, flat file, etc.) in which electronic records representing paths and steps may be stored, and associated. For example, a path may be stored in a one-to-one, one-to-many, or many-to-many relationship with one or more steps. A step may be stored in a similar relationship with respect to one or more canonical types. A user may configure and modify the respective relationships between workflows, steps, and canonical types using the methods and systems described herein. Furthermore, the data storage 124 may include user profiles corresponding to individual application users and/or classes of users, and the server device 102 may utilize to profiles to identify particular components to deliver to users of the application 122.

The workflow module 126 may generally include workflow metadata and instructions for managing workflows. Workflow metadata may include, for example, names, creation dates/times, unique identifiers associated with workflows, and/or state information associated with active workflows. Accordingly, the workflow module 126 may be communicatively connected to a data store in which workflows and steps are stored. The workflow module 126 may receive requests/queries, in response to which application 122 may take actions and issue responses. For example, workflow module 126 may execute and advance a workflow associated with a user by advancing a current step pointer from one step to another, for example, if the workflow module 126 determines based on an analysis of the query that a step has been successfully completed. The workflow module 126 may communicate information (e.g., indicative of a current step in a workflow) to the experience module 132, from which the experience module may identify a component from components associated with the step. Similarly, the workflow module 126 may terminate a given workflow, add a step to a workflow, create a new workflow, associate one or more canonical types with a step, evaluate a step, etc. based on instruction from the application 122.

The system of interaction 128 may generally store interaction records (or "entries") associated with application users. Generally, an "interaction," as used herein, may refer to a series of sub-interactions (e.g., messages exchanged between an application and a client device of a user and an application). Each interaction may correspond to one or more workflows, and each workflow may include one or more steps requiring engagement from the user (e.g., user supply, verification, or acknowledgement of information provided in a dynamic UX application). Accordingly, any particular interaction may correspond to a workflow executed over a small or large interval of time.

Interaction records at the system of interaction 128 may include, for example parameters (e.g., full legal name, home address, birth date, social security number, etc.) received from the workflow module 126 during execution of a workflow. Interaction records may additionally include timestamps associated with times at which the parameter values were received. Additionally or alternatively, interaction records may include indications of sources (e.g., other workflows, interaction records, or internal/external services) via which a parameter was retrieved. Furthermore, an interaction record may include security information defining security/authentication conditions upon which the system of interaction 128 may share information across interactions.

The step module 130 may include step metadata and instructions for executing steps. In some embodiments, the step module 130 may be integrated with the workflow module 126. Step metadata may include, for example, a list of workflows associated with respective steps, components associated with respective steps, and/or parameters and canonical types associated with inputs associated with respective steps. The step module may execute a series of steps sequentially for execution of a workflow. Generally, each step may include a response/request loop between the server device 102 and the client device 104 (e.g., the user of the client device 104 provides information, verifies information, or acknowledges information received from the server device 102). Execution of a step by the server device 102 may include monitoring and/or evaluating the user's interaction with the step (i.e., interaction with a provided component), as well as modifying a user experience based upon learned UX rules or learned information associated with a particular user. The experience module 132 may be implemented using a suitable application framework (e.g., Ember.js).

To guide delivery of components at client devices 104, the experience module may send messages to the protocol handler 136 in a "canonical request format" independent of communication protocols used by the client device 104. The protocol handler 136 may, in turn, deliver the component to the client device according to the appropriate communication protocol. Conversely, the protocol handler 136 may convert data payloads received from the client device 104 into a canonical format to be routed to the workflow module 126 and/or experience module 132.

In some embodiments, the experience module 132 may modify a component for delivery to a user based upon indications of already known information regarding a user. For example, with regard to a step for collecting personal information from a user, the experience module 132 may identify (e.g., based upon communication with other components of the server device 102) that one particular element of personal information is already known (e.g., from previous user interaction). Based upon this identification, the experience module 132 may alter the step by adding pre-populated information, and displaying an indication (e.g., a textual message and/or reordering of information) to the user that such information only needs confirmation by the user. The experience module 132 may receive an indication of known information regarding a user from the system of interaction 128 alone or in combination with the workflow module 126, in some embodiments.

In some embodiments, the experience module 132 may additionally communicate with the workflow module 126 to acquire workflow metadata, such as a number of steps remaining in a workflow, or an indication of one or more steps that are incomplete. Based upon such information, the experience module 132 may delay determination and/or delivery of a component to a client device 104.

The protocol handler 136 may receive requests/queries from a client device 104. The protocol handler 136 may examine requests, determine if each request is associated with a user or session, and if so, whether the user/session corresponds to an existing user/session. Sessions may be stored in a database communicatively coupled to server 102, or client 104. The protocol handler 136 may determine a network protocol and sub-protocol associated with a request, and may route the request to the workflow module 126 or another module, which may cause workflow module 126 to begin executing a workflow at a position (e.g., at a step). The position may be specified by a request, or may be associated with a user/session. In general, requests may be received by the protocol handler 136 and responses may be sent by the protocol handler 136. As used herein, the term "request" generally refers to an electronic request object that represents an exchange of information between a user and an application via the network 106. The terms "user request" and "request" may be used interchangeably. Requests and responses may be transferred between the server device 102 the client device 104 via a common data interchange protocol (e.g. via a representational state transfer (REST) API) or a proprietary data interchange protocol. While some of the examples herein refer specifically to requests and responses pertaining to, for example, credit card and auto insurance applications, it should be appreciated that the techniques described herein are applicable to many other types of applications. For example, a gaming application created for a mobile device may support its own form of user requests and responses. Requests may, for example, include information entered by a user during the execution of a dynamic UX application by a user of a client device 104 via the input device 150. For example, a user may enter information into a form, and press a "submit" button, which may cause the information to be transmitted and/or processed.

In some embodiments, more than one protocol handler 136 may be configured, and protocol handler 136 may be integral to a client and/or server in the environment 100. Code executing in a client device 104 may cause user requests to be sent to the server device 102, and may receive responses, potentially unbeknownst to the user. Requests may be sent by the client device 104 synchronously or asynchronously with respect to the execution of code in the client device 104. As noted, in addition to translating requests between clients and applications, the protocol handler 136 may route requests to application 122 components, and may also provide other modules with information pertaining to the capabilities of client devices. If a request type corresponds to a workflow initiation or resumption, then the protocol handler 136 may route the request to workflow module 126. Upon receiving a request, the workflow module 126 may determine whether to resume an existing interaction or begin a new one based on the request contents. Workflow module 126 may determine whether an interaction already exists by analyzing an indication and/or metadata from client device 104 (e.g., a UUID and/or an HTTP header). If an existing interaction is to be used, the workflow module 126 may retrieve the existing interaction from the system of interaction 128. If a new interaction is to be used, the workflow module 126 may initiate a new interaction (e.g., at the system of interaction 128). It should be noted that a user may also decide to cancel or terminate a workflow. Additionally or alternatively, a step may contain logic that causes a workflow to terminate if a certain condition is met, or if a particular input is provided to the step by a user (e.g., by a user of client 104). In some embodiments requests and responses may be respectively handled and issued by client device 104, either exclusively or in combination with the server device 102.

The client device 104 may include a processor (i.e., one or more processors) 160, a random access memory (RAM, i.e., one or more RAMs) 162, a communication module (i.e., one or more communication modules) 164, a program/application storage (i.e., one or more non-transitory storages) 166 that may store one or more applications 168, a data storage 170, a camera unit 172, and the input device(s) 150 and display device(s) 152. The processor 160 may include one or more CPUs, one or more graphics processing units (GPUs), and/or other processing units suitable to execute software instructions stored in the application storage 166, for example. The client device 104 may include one or more user-accessible client user interfaces (UIs), which may include software controlled by the server device 102 and delivered via the network 106.

The application storage 166 may include one or more persistent memories (e.g., hard drive and/or solid state memory), and may store one or more applications (web application, mobile application, etc.) 168 including, for example, one or more dynamic UX applications offered by an organization as described herein (e.g., applications for applying for a credit card, auto insurance, or for other products and/or services). The application 168 may load components (e.g., user interface components) and other application data received from the server device 102 into the RAM 162, and/or store such components/data at the data storage 170.

Generally, applications 168 at the client device 104 may, upon execution, cause the client device 104 to accept client device user input and/or provide output via one or more interfaces supported by the input device 150 and/or the display device 152. The input device 150 may include, for example, a microphone, a touch screen, a keyboard, a mouse, or another suitable input device. The display device 152 may include, for example, a screen display, a speaker, or some other suitable unit for providing output to a user of the client device 104. In some embodiments, the input device 150 and display device 152 may be integrated (e.g., as a touchscreen display capable of accepting input and producing output). Effectively, the input device 150 and display device 152 may collectively enable a user to interact with one or more user interfaces components provided via a dynamic UX application executing on the client device 104.

The client device 104 may transmit requests and/or other information to the server device 102 via the communication module 164 over the network 106. Requests may include data and/or metadata indications (e.g., a universally unique identifier (UUID) or other identifier) triggered by user interaction with the input device 150. Further the client device 104 may decorate requests with an indication of the type of the request. For example, the client device 104 may indicate a request as a request for a business resource, information regarding a user, information regarding execution of an application or application component, etc.). Communication between the client device 104 and the server device 102 may be implemented via one or more suitable communication protocols (e.g., HTTP, TCP, UDP, a cellular communication protocol, etc.) over the network 106.

It should be especially noted that, while one client device 104 is depicted, more than one, or many client devices 104 may be included in the environment 104. Multiple client devices may, for example, correspond to multiple users of a dynamic UX application, wherein the server device 102 may simultaneously manage execution and delivery of the dynamic UX application to the multiple users. Additionally or alternatively, one particular user may correspond to multiple client devices 104, and the server device 102 may manage execution and delivery of the dynamic UX application across multiple devices 104 of the user. A user may, for example, complete some steps of an active workflow via a first device, and other steps of the workflow via a second device via components particular to the first and second devices (e.g., a web form on a laptop computer and a voice call to a telephone). Because state information associated with the active workflow is managed at the server device 102, steps may be easily delivered across multiple client devices 104 corresponding to a user.

Example Workflow Structure and Execution

Figure 2:
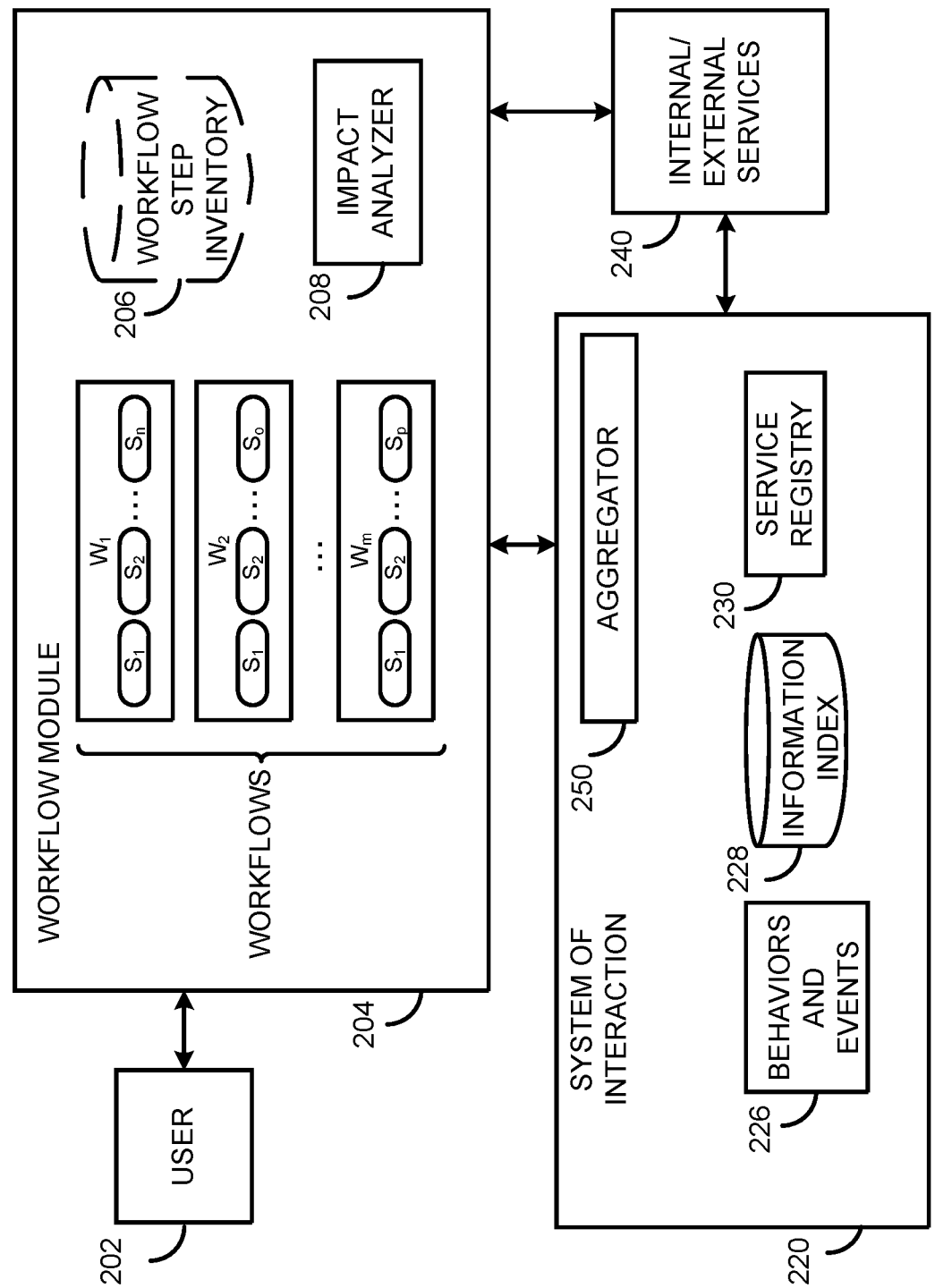
FIG. 2 depicts an example computing environment comprising a workflow manager, in accordance with some embodiments.

FIG. 2 depicts an example computing environment 200 for executing workflows and steps in a dynamic UX application, in accordance with some embodiments.

The environment 200 may include a user (i.e., one or more client devices corresponding to the user) 202 in communication with a workflow module 204, which may correspond or otherwise be included within the workflow module 126 depicted in FIG. 1. It should be understood that, while communication between the user 202 and the workflow module 204 is depicted simply via a bidirectional arrow, communications between the user 202 and workflow module 204 may include passing of information among the workflow module 204, the experience module 132, the protocol handler 136, and/or other server-side components as described herein.

The workflow manager 204 may a workflow step inventory 206, from which the workflow manager 204 may import instances of steps construct and store workflows associated with applications. The stored workflows may include workflows $W_1$-$W_m$, wherein m is any integer, and which may respectively contain steps $S_1$-$S_n$, $S_1$-$S_o$, and $S_1$-$S_p$ wherein n, o, and p may be any integers. That is, the steps in workflows $W_1$-$W_m$ may respectively include any number of steps. The steps may be ordered, in some embodiments, or may otherwise be associated with dependencies. However, it should be noted that the number of steps per workflow may differ. Therefore, in the depicted example, the indices n, o, and p may differ, in addition to the identity of the steps composing each respective workflow. Further, no two steps at the same position within a workflow may necessarily be the same (e.g., $W_1S_1$ and $W_2S_1$ may differ). Workflows may, in some embodiments, be generated and/or modified by an administrative user via an administrative interface (e.g., hosted at the remote computing system 102). Additionally or alternatively, workflows may be generated and/or modified automatically based upon learned information collected via use of applications by users.

The workflow module 204 may include a workflow step catalog 206, as well as an impact analyzer 208, which may correspond to the step module 130, in some embodiments. The workflow step inventory 206 may be an electronic database which may or may not be integral to workflow module 204. For example, in some embodiments, the workflow step inventory 206 may be a remote database communicatively coupled to a device in which workflow module 204 is included, via a network. The impact analyzer 208 may determine what information a workflow currently has regarding a user, and what additional information may be required to complete the workflow (e.g., to complete one or more particular steps therein). The impact analyzer 108 may determine which additional information is required by accessing, for example, a system of interaction 220.

In an embodiment, the workflow module 204 may load a workflow by a name provided in a uniform resource identifier (URI). The workflow may include a list of step references. The workflow module 204 may hydrate the workflow by instantiating an instance of each step reference in the workflow. The workflow module 204 may load step classes from the workflow step inventory 206. Accordingly, workflows may receive any changes implemented to steps, and/or the rules, dependencies, or components associated therewith. As the workflow module 204 instantiates each step reference, the workflow module 204 may associate the instantiated class with the respective step reference in the workflow being hydrated. The hydrated workflow may then be passed to a runtime. Steps may be annotated with canonical resource and type information as they are instantiated.

General, the system of interaction 220 may store information associated with users and their interactions with dynamic UX applications. The system of interaction 220 may, for example, include a "behaviors and events" index 226 that may include records of interactions (e.g., completion or lack of completion of steps, time to complete steps, explicit user feedback, validity of information provided via a component, or other indicators of efficacy of applications, workflows, steps, and/or components with regard to users) observed with regard to a user of a client device 104 executing a dynamic UX application. Action records may be connected to users via session, cookie, user identifier, or other suitable identifying information. Accordingly, the behaviors and events index 226 may be communicatively coupled to the experience module 132 to guide determination of steps and components to deliver to users in an active workflow.

The system of interaction may additionally include an information index 228 that may provide user information in response to a query by the impact analyzer 208, for example. User information at the information index 228 may, for example, include unique user identifying information (name, address, contact information, other personal information, etc.) that may have been collected from the user during earlier execution of an active application, from another application, or from another source of information regarding the user. Effectively, the information index 228 stores persistent information that, otherwise, may have been required to be asked of a client redundantly during execution of separate workflows and applications.

The system of interaction 220 may further include a service registry 230, which may function to (i) survey the information index to determine what information the system of interaction 220 already has regarding a user, and (ii) determine what additional internal/external services 240 (e.g., API-based services including services within the organization and external, third-party services) the system of interaction 220 may call to find additional information regarding a user. The service registry 230 may identify usable services, for example, via an algorithm to select a service that a data aggregator 250 may call to acquire information. Such an algorithm may, in some embodiments, be configured to observe business-defined rules regarding the sharing of information. User circumstances, particular elements of user information may be restricted from being shared by a service. For example, a rule may exist that restricts a user's social security number (SSN) from being shared between a credit card application and an auto insurance application (or alternatively, may allow SSN sharing only upon affirmative consent by the user). Effectively, such a restriction may require that a user re-enter the SSN in each active workflow, even if other services within the organization or external services may have access to the SSN (e.g., via the user's previous interactions with applications, products, and/or services).

The aggregator 250 may collect user data from internal/external services 240 and combine the collected data with information from the information index 228 to acquire a complete view of what information the system of interaction 220 has regarding a user. The aggregator 250 may communicate this knowledge to the workflow module 204, which may, in some embodiments, cause modification of the workflow. For instance, the workflow module may determine that an active workflow step (e.g., step $S_2$ of workflow $W_1$) that normally requires two elements of personal information (e.g., address and date of birth) from a user may instead only need to require one of those elements, and thus may cause modification of a step (e.g., pre-population of a field in a web form interface, or removal of the field altogether). In some situations, the workflow module 204 may even determine that all information required by a step is already on record at the system of interaction 220, and thus may cause a step in a workflow to be passed entirely. Thus, the workflow module 204 may communicate with the system of interaction 220 to prevent redundant collection of information, where appropriate.

In some embodiments, the additional required information determined by impact analyzer 208 may be grouped by step. The impact analyzer 208 may cause the workflow module 204 to modify the ordering of steps within the workflow, or to move the current step pointer to a particular step in response to missing information, or in response to a question in a step being answered in a specific way, or in response to a user-initiated event. For example, the impact analyzer 208 may cause the workflow module 204 to redirect the user to a step that indicates that the workflow is unable to continue the steps because the step needs missing information from the user. Once the user provides the additional information that is required, by sending a response received by workflow manager 204, impact analyzer 208 may analyze what steps can be executed with the new information.

Example Interaction Records

FIGS. 3A and 3B depict example interaction records (or "entries") that may be stored, updated, queried, etc. at a system of interaction (e.g., the system of interaction depicted in FIGS. 1 and 2) as a result of user engagement with one or more dynamic UX applications. The depicted interaction records include a "Completed" Interaction Record A (corresponding, for example, to a previously completed workflow for applying for a credit card) and an "Active" Interaction Record B that may correspond to the same user's active attempt to apply for automotive insurance, for example. It should be understood that more than two interactions may correspond to a single user, or to each of many users. Furthermore, while a variety of information will be described as included in each interaction record, it should be understood that any of the information in the interaction records may be dispersed across multiple sources within the system of interaction. Interaction records may comprise various additional information regarding users, application sessions, etc. As will be described herein, information regarding a user may be shared across interaction records associated with two or more applications and/or workflows, in some embodiments.

The Completed Interaction Record A may correspond to a workflow completed by the user identified by a unique username "jDoe61." A workflow state (e.g., "Credit01.7," i.e. a Step 7 which may be a final step of a credit card workflow Credit01) may identify a current state of a workflow associated with the interaction. In some embodiments, the interaction record may client device and/or client device session identification information. Furthermore, the interaction record may store indications of behaviors (e.g., survey data, engagement with application components, or other behaviors/tendencies observed by an experience manager) observed from the user during the interaction.

The Interaction Record A may include a multiplicity of information "parameters" associated with the user (e.g., full name, address, date of birth ("DOB"), credit score, occupation, and social security number). Stored parameters may correspond to information collected from the user at one or more steps of the credit card application workflow. Each parameter value may be stored at the Interaction Record A in a canonical data format (e.g., DOB as a MM/DD/YYYY text string) to be consistent across all interaction records, regardless of the communication protocol via which the parameter was received. Accordingly, receiving information at the system of interaction may include parsing a message received from a user and converting the information to the canonical data format. Alternatively, canonical data format conversion may be performed via other components of the remote computing device 102 (e.g., at a protocol handler particular to the communication protocol used in receiving information).

Each parameter may be associated with a timestamp indicating the date and/or time at which the information was received. Furthermore, each parameter may be associated with a source of the received parameter value. A source of a received parameter in the record may, for example, be a particular step of the credit card application workflow, or an external service specially configured to retrieve the particular information (e.g., a credit score service).

Each parameter may further be associated with a "class" defining how a parameter may be discovered and shared across the system of interaction. A "class 1" parameter may indicate, for example, an element of information that may be shared across the system of interaction with no restrictions. A "class 2" parameter may indicate, for example, information that may be shared across the system interaction only upon affirmative consent from the user. A "class 3" parameter may, for example, indicate information that may only be discovered by an internal and/or external service call, and thus may not be asked from the user. A "class 4" parameter may indicate information that is unknown within the record, unknown across the entire system of interaction, and/or not allowed to be shared across interactions by the system of interaction. As an example, particularly sensitive user information such as a user's social security number may not be allowed to be shared between the Interaction Records A and B, and thus, each workflow requiring a user's social security number may be required to acquire the social security number independently, regardless of the presence of the social security number in the record for Interaction A. A parameter may be associated with more than one class, in some embodiments. Furthermore, because the status of whether a parameter is "known" or "unknown" by the system of interaction, one or more classes associated with a parameter may be subject to change during the interaction.

To provide additional security to user information, each parameter may further be associated with a "Level of Assurance" (LOA) value corresponding to a level of confidence in an asserted identity of an application user (i.e., based upon completed authentication tasks or lack thereof). The LOA value associated with a parameter may define the LOA level that a dynamic UX application must achieve with regard to the user before the parameter may be shared across the system of interaction and/or displayed to the user within the application. Because an LOA value refers to the sensitivity of a parameter itself, an LOA value associated with a parameter may be constant throughout the interaction and across interactions, in some embodiments.

Generally, a particular Level of Assurance may be achieved once (i) a dynamic UX application provides, to a user, one or more authentication steps associated with the particular Level of Assurance, (ii) the user provides the information requested by the one or more authentication steps, and (iii) the dynamic UX application verifies the information provided by the user. In some embodiments, providing an authentication step may include modifying a workflow associated with a dynamic UX application (e.g., by dynamically inserting an authentication step within the workflow).

Generally, a Level of Assurance 1 ("LOA1") may require only minimal confidence in a user's identity. Accordingly, LOA1 parameters may generally include parameters that would carry little to no risk if shown to an erroneously authenticated user. As an example, showing a user's full name in a dynamic UX application may carry little to no risk, and thus, the "full name" parameter may be characterized as LOA1.

A Level of Assurance 2 ("LOA2") may require slightly higher confidence in a user's identity. Accordingly, LOA2 parameters may generally include parameters that may have some sensitivity. As an example, showing a user's street address, phone number, or occupation in a dynamic UX application may carry moderate risk. Achieving LOA2 within a dynamic UX application may, for example, require a user to enter a username and/or password, or verify identity via proof of possession of a second client device associated with the user.

A Level of Assurance 3 ("LOA3") may require high confidence in a user's identity. Accordingly, LOA3 parameters may include parameters that have high sensitivity. Achieving LOA3 within a dynamic UX application may, for example, require proof of possession of a second client device plus login information (i.e., username/password).

A Level of Assurance 4 ("LOA4") may require extremely high confidence in a user's identity, and thus LOA4 parameters may include extremely sensitive user information (e.g., a social security number). Achieving LOA4 within a dynamic UX application may, for example, require a user to enter login information and provide biometric authentication (e.g., fingerprint and/or facial authentication). In some embodiments, a dynamic UX application may entirely restrict LOA4 information sharing, particularly when LOA4 authentication mechanisms may not be available in the application.

Dynamic UX applications may provide authentication steps by any of the techniques described in this detailed description. For example, a step inventory 206 of FIG. 2 may store an authentication step and, upon determination that a user authentication is necessary to execute a query information from the system of interaction and/or to execute another step in an active workflow, the workflow module 204 may add or insert an instance of an authentication step within the active workflow. It should be understood that the user authentication mechanisms herein should not be interpreted as exhaustive. Various other user authentication mechanisms may be possible via dynamic UX applications, including mechanisms accepted in the field of computer security for authenticating users of applications.

Turning now to FIG. 3B, an "Active" Interaction Record B may correspond to an in-progress workflow via which the user jDoe61 may apply for auto insurance in a dynamic UX application. The auto insurance workflow may be executed, for example, via the workflow manager 204 described with regard to FIG. 2.

In some embodiments, interactions may occur at least partially anonymously. As an example, a user may start a workflow in a dynamic UX application to apply for auto insurance without first logging in or creating a user account. In these embodiments, the system of interaction may store a user interaction record without an entry in the "User" field, either until the user chooses to log in to or create an account, or until the workflow requires the user to do so. Of course, because the system of interaction generally may query interaction records based upon a user's unique username, performing a workflow anonymously may limit the capability of the system of interaction to query interactions associated with the user. In some embodiments, while an interaction is anonymous, the interaction may persist across client device sessions via tracking unique client device identification information at the record.

For sake of simplicity in describing the "Active" Interaction Record B, it will be assumed that the user logged in to the user's existing account under the username jDoe61. The user may indicate, via a dynamic UX application at a client device of the user, an objective to apply for auto insurance, and thus the user may begin a workflow "Auto02" for applying for an auto insurance policy.

A first step of the auto insurance application workflow may, for example, the user to provide the user's full name (e.g., via a web form, SMS text message, or another user interface component presented at a client device of the user). Before executing the first step, however, a workflow module may query the system of interaction to determine whether the system of interaction already has access to the user's full name. A query may, for example, include the username and the level of authentication already received from the user. The system of interaction may then, in turn, determine (i) that an Interaction Record A (and/or one or more other interaction records) already exists for the user jDoe61, (ii) that "full name" is an LOA1 requiring little authentication, and (iii) because the low bar of authentication has been achieved in the auto insurance workflow, the Interaction Record A may share the full name parameter to the Interaction Record B. The Interaction Record B may thus populate the full name parameter value, and further associate the parameter with the timestamp and/or source included in the Interaction Record A. The system of interaction may return, to the workflow module, an indication of the parameter value retrieved and the LOA.

Based upon the availability of the full name parameter, the workflow module may modify execution of the Auto02 workflow. As an example, the workflow module, via the experience manager, may cause the first step to simply display the user's full name to allow the user to provide a confirmation. Alternatively, the workflow module may cause completion of the first step entirely, such that, from the user's perspective at the client device, the user is able to proceed directly to a second step of the Auto02 workflow.

A second step of the Auto02 workflow may, for example, require the user to provide the user's home address and date of birth ("DOB"). As depicted in FIG. 3A, the user's address and DOB may already be recorded in the Interaction Record A. However, it is also apparent that address is an LOA2 parameter, and date of birth is an LOA3 parameter. Thus, the system of interaction may not be able to retrieve the parameters unless the user has achieved authentication levels LOA2 and LOA3 respectively.

As an example, because the user has already logged in to the user's account, LOA2 authentication may already have been achieved via the dynamic UX application, while LOA3 may not have been achieved. The workflow module may query the system of interaction indicating the requested parameters and the achieved LOA. Because the address parameter corresponds to an achieved LOA, the system of Interaction Record A may share the address to the Interaction Record B. However, because DOB corresponds to a higher LOA, sharing of the DOB parameter may not yet be allowed. In some embodiments, the system of interaction may return, to the workflow module in response to the query, an indication that the DOB parameter was not found at the system of interaction. In other embodiments, the system of interaction may return, to the workflow module in response to the query, an indication that the DOB parameter is available at the system of interaction, but requires (i) the user's permission to share information across interactions, and/or (ii) an authentication step to elevate the user to a higher LOA. In some of these embodiments, the workflow manager and/or the experience manager may determine whether to provide an (optional or required) permission step and/or authentication step to enable information sharing, or whether the workflow module should simply ask for the user's date of birth again in the step (if, for example, receiving permission and/or authentication would place a greater burden on the user than simply asking for the parameter).

A third step of the auto insurance workflow may, for example, require the user's credit score. The workflow module may query the system of interaction for the user's credit score. If the user has not achieved the required LOA3 or has not provided a required permission for sharing of the credit score, the system of interaction may be required to re-determine the user's credit score. Furthermore, if a timestamp on the credit score parameter indicates that the "age" of the user's determined credit score exceeds a predetermined threshold (e.g., one month), the system of interaction may require the credit score to be re-determined. In embodiments where a parameter value is available via service calls, the system of interaction may initiate one or more internal and/or external service calls to determine the parameter value. Generally, calling a service may include determining, via a service registry at the system of interaction, a least number of service calls necessary and/or one or more optimal service calls to return one or more required parameter values.

A fourth step of the auto insurance workflow may, for example, require the user's social security number (SSN). However, because the social security number parameter is an LOA4 parameter, sharing an SSN across interactions may not be allowed. In some embodiments, the workflow module may determine that an SSN is not available via the system of interaction. In other embodiments, the workflow module may transmit a query to or otherwise invoke the system of interaction, and the system of interaction may return an indication that the SSN parameter may not be shared across interactions, and thus, a user must be asked for the parameter independently in the Auto02 workflow.

Various other workflows, steps, and parameters are possible, in other embodiments. Furthermore, where a technique for managing a workflow, step, or parameter is described with regards to FIG. 3A or FIG. 3B, it should be understood that the technique may be applied to other workflows, steps, or parameters, unless indicated otherwise.

Example Modifications Based Upon Interaction Records

FIGS. 4A and 4B depict example "web" form user interface components that may be provided to a dynamic UX application user (e.g., via the remote computing system 102 of FIG. 1) at a client device, and via which the user may provide their home address and/or date of birth complete a step associated with providing (e.g., the "second step" of the Auto02 workflow described with regard to FIG. 3B). The web form component may, for example, cause an application on the client device to automatically navigate a web browser to web page displaying the web form, or alternatively, may display a URL within the application, and the user may touch or click the URL to navigate to the web form.

Referring more particularly to FIG. 4A, a web form interface 420 may enable the user to enter the user's address and date of birth via a text box and a set of drop down boxes, respectively. Once the user enters the provided information ("submit"), the information may be converted to a canonical data type associated with the address and date of birth parameters, and stored at a system of interaction record associated with the active workflow.

FIG. 4B depicts an alternative web form interface 440 that may be provided to the user if a workflow module and system of interaction determine that the address parameter is available to be shared to the interaction record associated with the active workflow. Prior to providing the web form component, the experience manager may receive an indication that one or more parameters associated with the step are already available to the system of interaction, and alter the component based upon the available parameters. Accordingly, the address field may be pre-populated upon loading of the web form, with buttons allowing the user to either "confirm" or "change" the pre-populated parameter value. In some embodiments, as described herein, the web form interface 440 may be preceded by (i) a step requesting the user's permission for the address to be shared from another interaction (e.g., the credit card application interaction record), and/or (ii) a step requesting further user authentication to achieve an LOA that would allow for sharing of the address from the other interaction.

Various other user interface components are possible. For example, a step may be provided to a user in the form of an SMS message requesting one or more information parameters from the user. Based upon information available at the system of interaction, the experience manager may, for example, remove a request for a particular parameter from the SMS message to be delivered to the user.

Example Environment for Implementing Dynamic UX Workflows

Figure 5:
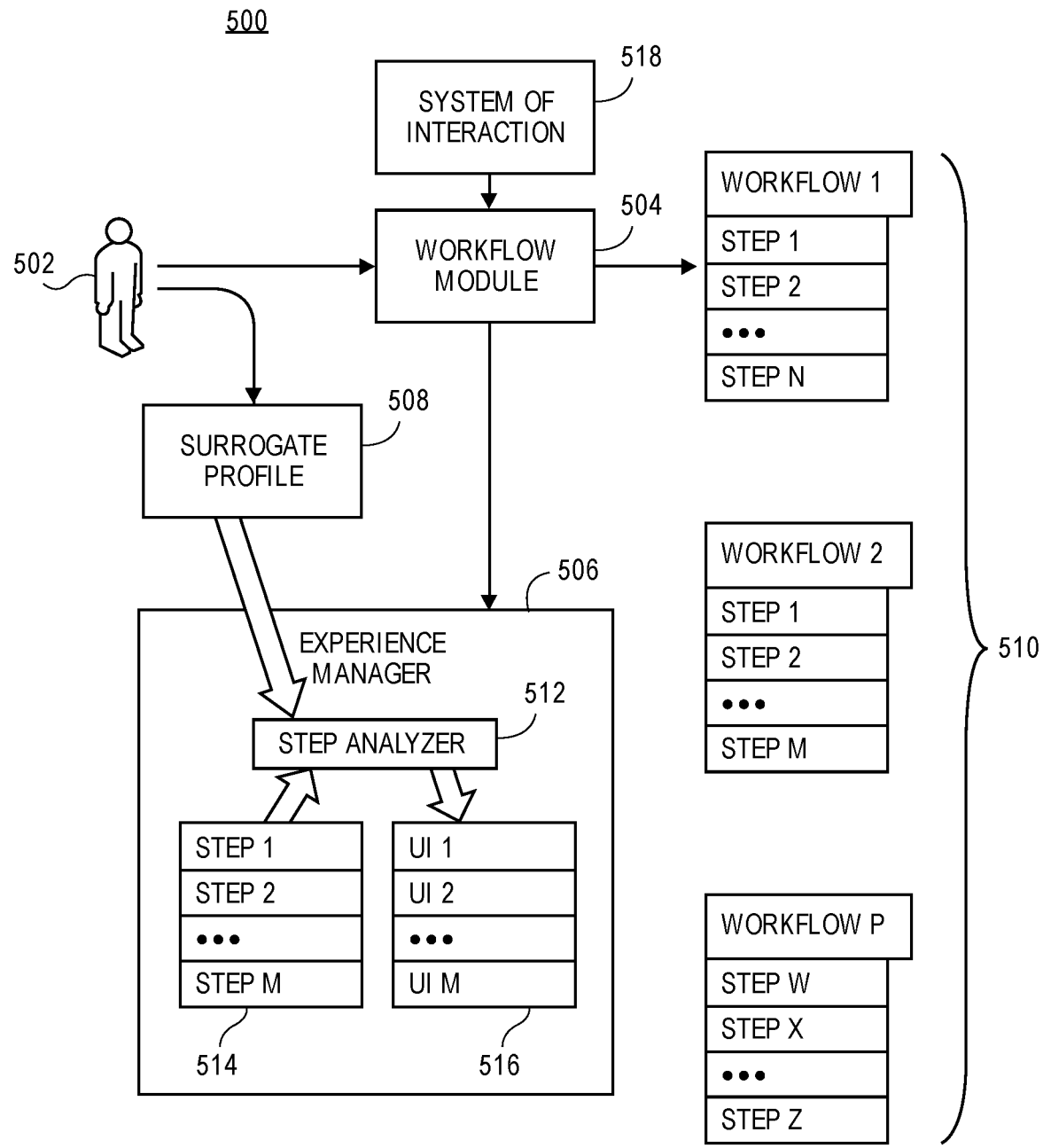
FIG. 5 depicts an example flow diagram modeling execution of a workflow, in accordance with some embodiments.

FIG. 5 depicts an example flow diagram 500 for executing workflows within a dynamic user experience (UX) application, according to some embodiments. Generally, the elements of the flow diagram 500 may correspond to similar computing elements depicted in FIGS. 1 and 2. Communication between elements of the flow diagram 500 may be implemented, for example, via the network(s) 106 described with regard to FIG. 1.

The flow diagram 500 may include a user 502 utilizing one or more client devices (e.g., desktop, laptop, smartphone, combinations thereof, etc.) to use a dynamic UX application. Where actions herein are attributed to the user 502, it should be understood that those actions may be performed via one or more client devices of the user 502, for example, in response to human input provided by the user 502. The flow diagram may further include a workflow module 504 (e.g., corresponding to the workflow module 126 of FIG. 1), an experience manager 506 (which may correspond to the experience module 132), and user/surrogate profile 508. The workflow module 504 may correspond to a list of workflows 510 (e.g., Workflows 1, 2 . . . P, each of which may include one or more steps). It should be understood that any number of workflows may be possible, and each may include any number of steps (i.e., different numbers of steps). The experience manager 504 may include a step analyzer 512 (which may correspond to the step module 130), a list of steps 514 (which may correspond to an active workflow, e.g., Workflow 1 from list 510) executing on behalf of the user 502, and a list of components 516 generally corresponding to the list of steps 514.

The user 502 may open or access a dynamic UX application (e.g., application 122 or 168), which may receive or retrieve a list of workflows (e.g., Workflows 1, 2 . . . P, each comprising one or more steps). In some embodiments, the user 502 may select a workflow corresponding to a task that the user would like to perform (e.g., "apply for a credit card"), and the selection may be transmitted as a request to the workflow module 504. Additionally or alternatively, the workflow module 504 may automatically select a particular workflow on behalf of the user 502, in response to the user 502 opening the application.

In any case, the workflow module 504 may identify, based upon the selected workflow, the collection of steps included therein, as well as current state information associated with the workflow, such as a step pointer to the currently active step in the workflow. For simplicity, this example assumes that the selected workflow is a new workflow, and thus the state information indicates that the first step in the workflow should be executed. Additionally, the workflow module 504 may communicate with a system of interaction 518 to query interactions associated with the user 502 and/or call services to identify accessible information associated with the user 502.

Communication between the workflow module 504 and the experience manager 506 may direct execution of the workflow, beginning with the first step. The workflow module 504 may transmit the list of steps 514 simultaneously, or sequentially upon execution, to the experience manager 506.

At the experience manager 506, the step analyzer 512 may analyze the first step to identify a user interface component (e.g., UI 1, UI 2 . . . U1 M) from the list of components 216 to deliver to the user 502 to perform the first step. It should be understood that, while a one-to-one correspondence between a step and a component may be described herein, other embodiments are possible. For example, multiple steps may be performed via a single component, or a step may correspond to multiple components.

The experience manager 506 may maintain a pointer to the active workflow step, beginning at the first step. The step analyzer 512 may identify a particular component to deliver to the user 502, for example, based upon the user/surrogate profile 508 or other learned information. Furthermore, the step analyzer may receive an indication of information retrieved by the workflow module 504 via the system of interaction 518, and may use the indication of retrieved information, for example, to modify a component (e.g., by pre-populating information and/or including a request to allow sharing of information from the system of interaction 518) to prevent redundant requests of information from the user 502.

The experience manager 506 may identify a component and deliver that component to the user 502 using the techniques described in this detailed description (e.g., using the protocol handler 136 of FIG. 1). The experience manager 506 may receive feedback (e.g., the request information) from the user 502, and may forward the information to the workflow module 504. Additionally or alternatively, the user 502 may transmit information directly to the workflow module 504. In any case, the workflow module, in turn, may transmit the information to the system of interaction 518 which may convert and/or store the information in a canonical data type within an interaction corresponding to the active workflow. Upon validation of the information and conversion of the received information into canonical format, the workflow module 504 may record the first step as complete (or, in some embodiments, partially complete) advance the workflow to a next step, and indicate to the experience manager 506 the next step to be performed. The experience manager 506 may update its pointer to reference a newly active step in the workflow. As each step executes, additional information may be learned about the user 502 and/or about other users of the application. Accordingly, behaviors and events associated with the user 502 at each step may be used to update the profile 508 and/or update other learned information. Furthermore, the system of interaction 518 may be updated at each step to reflect information received from the user 502.

Additional Interaction Record Management Techniques

In some embodiments, methods may be provided for resolving conflicts between information included in interaction records at a system of interaction. For example, referring back to FIG. 3A, a user may have previously completed a credit card application workflow indicating a home address of "123 Main Street." In a second workflow, however, the user may provide a different address, possibly indicating a change of address by the user. Thus, two conflicting interaction records regarding the user may exist at the system of interaction. Generally, the system of interaction records may resolve conflicts by examining the timestamp associated with each conflicting parameter, determining the most recent timestamp, and updating all interactions associated with the user to reflect the value associated with the most recent timestamp (e.g., the most recent address). Conflict resolution at the system of interaction may be triggered, for example, in response to (i) detection of a conflict based upon newly received user information (i.e., from an active step or workflow), (ii) detection of a conflict across interaction records returned via a query from a workflow module, and/or (iii) an automatic (e.g., scheduled) conflict resolution event at the system of interaction.

In some embodiments, interactions may be associated with a lifetime (e.g., 30 days), and if a user has not completed a workflow associated with an interaction within a lifetime for the interaction, the interaction may "expire." For example, if a user begins a credit card application workflow but does not finish the workflow within 30 days, the interaction may expire and be deleted from the system of interaction, and the user may be required to restart the workflow if the user returns to the credit card application workflow. In some embodiments, completing a particular step or satisfying another condition in a workflow may cause extension of an interaction lifetime.

In some embodiments, the system of interaction may "merge" interaction records in some circumstances. For example, a user may begin a credit card application under a logged-in account, and provide some information necessary for the credit card application workflow. Thus, the system of interaction record may store a first record associated with the user and the credit card application workflow. However, during the lifetime of the first interaction, the user may logout from an account and forget that the user has already started the credit card application workflow, and thus may begin a second, anonymous interaction. Once the user logs in during the second interaction, two records may simultaneously exist for a same user and same workflow. In response to detecting simultaneous, conflicting interactions, the system of interaction may "merge" the two interaction records into one interaction record (e.g., using the most recent version of each element of information included in either or both of the interaction records).

In some embodiments, interaction records may be split into "front-facing" interaction records and "back-facing" interaction records. For example, the system of interaction may split the Interaction Record A of FIG. 3A into a front-facing record reflecting truth of information to a user and a back-facing record reflecting truth of information to back-end systems and services. For example, regarding a user's full name, a front-facing record may store, under a "full name" parameter, a value of "Jon Doe," that is more viewable to the application user, while the back-facing record may store "Jonathan Doe" for the purposes of back-end business processing.

Actions of the system of interaction described herein may be executed at any time during execution of one or more dynamic UX applications, workflows, steps, and/or components, unless indicated otherwise.

Method for Reconciling a User Interaction

Figure 6:
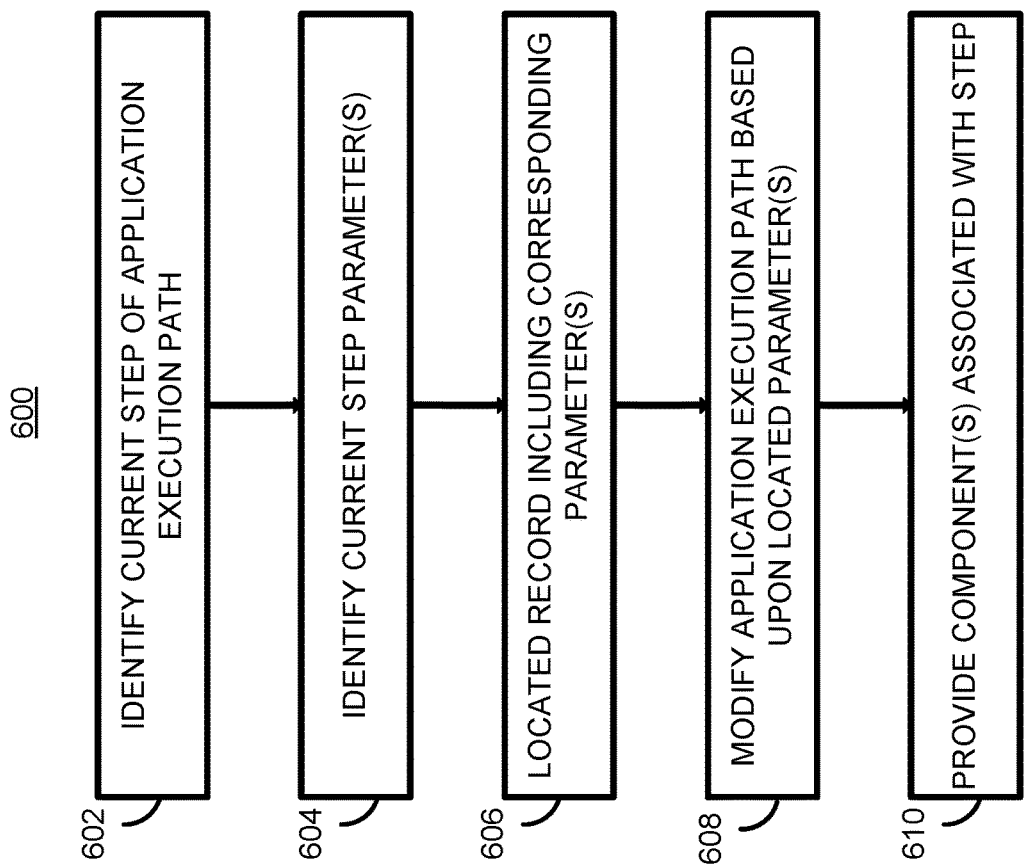
FIG. 6 depicts an example method of reconciling a user interaction with a dynamic user experience application, in accordance with some embodiments.

FIG. 6 depicts an example computer-implemented method 600 for determining an efficacy of a dynamic user experience application operating at a user device (or "client device" associated with a user). The method 600 may be performed, for example, via the environment 100 using the principles and techniques described throughout this detailed description.

The method 600 may include identifying, via a remote computing system (e.g., the remote computing system 102), a current (i.e., active) step of a first application execution path (i.e., an active workflow) associated with execution of the dynamic user experience (UX) application at a user device (602). The active workflow may, for example, be workflow for applying for a credit card. The current step may, for example, for example, be a step for providing a user's home address and date of birth.

The method 600 may further include identifying, via the remote computing system, one or more step parameters associated with the current step (604).

The method 600 may further include locating, via the remote computing system, a first stored entry (e.g., an interaction record) including one or more stored parameters corresponding to the user and to at least one of the one or more step parameters (606). Generally, the first stored entry may be associated with a second workflow independent of the first workflow (e.g., a second workflow associated with an auto insurance application that may collect similar user information). Locating the stored entry may include (i) determining a Level of Assurance (LOA) of one or more parameters in the stored entry, (ii) determining a current LOA of the user in the dynamic UX application, and (iii) determining, based upon the parameter LOA and the user LOA, whether a parameter may be shared across interaction entries to the active workflow.

The method 600 may further include modifying, via the remote computing system the workflow, based upon the one or more stored parameters (608). Modifying the workflow may include, for example (i) adding/inserting a permission step or authentication step to the workflow to allow for sharing of the stored parameters to the workflow, (ii) removing a parameter from the current step within the workflow, (iii) modifying a component associated with the current step (e.g., by pre-populating or altering a field as depicted in FIG. 4B), and/or (iv) advancing a current step point associated with the active workflow (i.e., moving to the next step in the workflow).

The method 600 may further include providing, via the remote computing system, one or more application components to the user device, wherein the one or more components are associated with the current step and the modified first application execution path (610). The provided one or more components comprise one or more interactive user interfaces (e.g., the interfaces 420 and 440 depicted in FIGS. 4A and 4B, respectively, usable on the user device to provide the user information corresponding to the step parameters.

In some embodiments, the method 600 may further include entry conflict resolution, lifetime management, and/or merging, as described in this detailed description. For example, the method 600 may include locating a conflicting entry including one or more stored parameters that conflict with one or more stored parameters of the first stored entry. The method 600 may further include updating either the conflicting entry or the first stored entry using the conflict resolution techniques described herein (e.g., by using timestamps to identify the most recent value of the parameter, and changing the older entry to reflect updated parameter and the source of the updated parameter).

In some embodiments, the method 600 may further include updating an entry associated with the active workflow (e.g., based upon information received from the user or information shared across entries).

The method 600 may include additional, fewer, or alternate actions, including those described in this detailed description.

Additional Considerations

With the foregoing, any users (e.g., insurance customers) whose data is being collected and/or utilized may first opt-in to a rewards program, an insurance discount program, or another type of program. After the user provides their affirmative consent, data may be collected from the user's device (e.g., mobile device or other smart devices). Of course, local storage and use of a disposable UI at a user device (e.g., the client device 104 of FIG. 1) by an anonymous user may have the benefit of removing any concerns of privacy or anonymity, by removing anything except the minimum user interface elements needed to render steps and workflows, without storing data permanently on the client device 104. In such instances, there may be no need for affirmative consent.

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . ." or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Unless a claim element is defined by reciting the word "means" and a function without the recital of any structure, it is not intended that the scope of any claim element be interpreted based upon the application of 35 U.S.C. § 112(f). The systems and methods described herein are directed to an improvement to computer functionality, and improve the functioning of conventional computers.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more modules of a computer system (e.g., a processor or a group of processors) may be configured by software (e.g., an application or application portion) as a module that operates to perform certain operations as described herein.

In various embodiments, a module may be implemented mechanically or electronically. Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules are temporarily configured (e.g., programmed), each of the modules need not be configured or instantiated at any one instance in time. For example, where the modules include a general-purpose processor configured using software, the general-purpose processor may be configured as respective different modules at different times. Software may accordingly configure a processor, for example, to constitute a particular module at one instance of time and to constitute a different module at a different instance of time.

Modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, include processor-implemented modules.

Similarly, the methods or routines described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment. In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

This detailed description is to be construed as exemplary only and does not describe every possible embodiment, as describing every possible embodiment would be impractical, if not impossible. One could implement numerous alternate embodiments, using either current technology or technology developed after the filing date of this application. Upon reading this disclosure, those of skill in the art will appreciate still additional alternative structural and functional designs for generating dynamic user experience applications through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein. It is therefore intended that the foregoing detailed description be regarded as illustrative rather than limiting, and that it be understood that it is the following claims, including all equivalents, that are intended to define the spirit and scope of this invention.

What is claimed is:

1. A computer-implemented method for reconciling a user interaction associated with a dynamic user experience (UX) application, the method comprising:
identifying, by a remote computing system associated with an organization, a current step of a workflow associated with execution of the dynamic UX application at a mobile computing device, wherein the current step of the workflow:
requires a step parameter for completion, and
comprises one or more application components;
identifying, by the remote computing system, a plurality of information sources storing records of previous interactions between a user of the mobile computing device and the organization, the records including a plurality of stored values corresponding to the workflow, wherein the plurality of information sources includes information sources:
within the organization that are accessible by the remote computing system via an internal service call, and
outside the organization that are accessible by the remote computing system via an external service call;
identifying, by the remote computing system, an access class associated with the step parameter, wherein the access class:
defines a type of action that the remote computing system is permitted to take in order to retrieve a stored value of the step parameter from an information source of the plurality of information sources, and
is applied irrespective of user identity;
determining, by the remote computing system and based on the access class associated with the step parameter, a subset of the plurality of information sources that the remote computing system is permitted to access, wherein
application of the access class prohibits the remote computing system from retrieving stored values of the step parameter from a remainder of information sources not included in the subset;
identifying, by the remote computing system, a minimum authentication level associated with the step parameter;
receiving, by the remote computing system and from the mobile computing device, first information indicative of an identity of a user of the mobile computing device;
identifying, by the remote computing system and based on a public availability of the first information, a current authentication level, the current authentication level being indicative of a level of confidence in the identity of the user indicated by the first information;
determining, by the remote computing system, that the current authentication level satisfies the minimum authentication level associated with the step parameter;
based on the current authentication level satisfying the minimum authentication level, accessing, by the remote computing system and from the subset of the plurality of information sources, a stored entry of the records of previous interactions, the stored entry including a first stored value of the step parameter corresponding to the identity of the user;
modifying, by the remote computing system and by providing the first stored value to the dynamic UX application, an application component of the one or more application components; and
providing, by the remote computing system, the modified application component to the mobile computing device.

2. The computer-implemented method of claim 1, wherein the one or more application components comprise one or more interactive user interfaces usable on the mobile computing device to provide the stored values corresponding to the workflow.

3. The computer-implemented method of claim 1, further comprising:
modifying, by the remote computing system and based on the stored entry, the workflow,
wherein modifying the workflow further comprises advancing a current step pointer associated with the workflow.

4. The computer-implemented method of claim 3, wherein modifying the workflow comprises adding or inserting a permission step or an authentication step to the workflow.

5. The computer-implemented method of claim 1, further comprising:
locating, by the remote computing system, a conflicting entry including a second stored value, different from the first stored value, of the step parameter; and
updating, by the remote computing system, either the stored entry or the conflicting entry based on timestamps associated with the first stored value of the stored entry and the second stored value of the conflicting entry.

6. The computer-implemented method of claim 1, wherein the workflow is a first workflow, the method further comprising:
updating, by the remote computing system, a tracking entry associated with the first workflow to indicate the stored entry as a source of the first stored value of the step parameter;
locating, by the remote computing system, a second workflow including a second stored value, different from the first stored value, of the step parameter;
determining, by the remote computing system, that the tracking entry associated with the first workflow indicates a security level greater than the tracking entry associated with the second workflow; and
based on determining that the tracking entry associated with the first workflow indicates a security level greater than the tracking entry associated with the second workflow, updating, by the remote computing system, a value of the step parameter of the second workflow to the first stored value.

7. The computer-implemented method of claim 1, wherein modifying the application component comprises removing, from the application component, one or more interactive user interface elements associated with the step parameter of the current step.

8. The computer-implemented method of claim 7, wherein the workflow is a first workflow, the method further comprising:
updating, by the remote computing system, a tracking entry associated with the first workflow indicating the stored entry as a source of the step parameter;
receiving, by the remote computing system, via the modified application component and associated with a second workflow different from the first workflow, a second value of the step parameter;

determining, by the remote computing system, that the value is different from the first stored value; and determining, based comparing the tracking entry and the current authentication level of the second workflow, either the second value or the first stored value as a value of the step parameter.

9. The computer-implemented method of claim 1, wherein:
the current authentication level corresponds to a first level of confidence associated with receipt of the first information of the user,
the minimum authentication level associated with the step parameter corresponds to a second level of confidence associated with receipt of a second information of the user, and
determining that the current authentication level satisfies the minimum authentication level associated with the step parameter comprises determining that the public availability first information is same as or less than the second information.

10. The computer-implemented method of claim 1, further comprising:
receiving, by the remote computing system, additional personal information of the user; and
updating, by the remote computing system and based on a public availability of the additional personal information, the current authentication level.

11. The computer-implemented method of claim 10, wherein the additional personal information of the user includes at least one of: login information of the user, date of birth of the user, proof of possession of a second client device of the user, or a biometric authentication of the user.

12. The computer-implemented method of claim 1, wherein the application components comprise one or more of: a web form, a text message to be transmitted to the mobile computing device, or a voice interaction with the mobile computing device.

13. The computer-implemented method of claim 1, further comprising:
requesting, by the remote computing system and based on the access class associated with the step parameter, from the mobile computing device, permission to access the first stored value.

14. The computer-implemented method of claim 1, wherein the type of action is indicative of
accessing an information source via an internal service call, or
access to information sources via an external service call.

15. The computer-implemented method of claim 1, wherein the access class of the step parameter is:
based on a sensitivity of a personal information associated with the step parameter, independent of the current authentication level, and
agnostic to a role of the user.

16. The computer-implemented method of claim 1, further comprising:
receiving, by the remote computing system and via the modified application component, information related to a further step of the workflow;
identifying, by the remote computing system, one or more additional steps of the workflow that may be completed based on the received information;
updating, by the remote computing system and based on the one or more additional steps, a set of remaining step parameters required for completing the workflow; and modifying the workflow by the remote computing system and based on the set of remaining step parameters.

17. A computing system associated with an organization, comprising:
one or more processors; and
one or more memories storing computer-executable instructions that, when executed by the one or more processors, cause the computing system to:
identify a current step of a workflow associated with execution of a dynamic UX application at a mobile computing device, wherein the current step of the workflow:
requires a step parameter for completion, and
comprises one or more application components;
identify a plurality of information sources storing records of previous interactions between a user of the mobile computing device and the organization, the records including a plurality of stored values corresponding to the workflow,
wherein the plurality of information sources includes information sources:
within the organization that are accessible by the computing system via an internal service call, and
outside the organization that are accessible by the computing system via an external service call;
identify an access class associated with the step parameter, wherein the access class:
defines a type of action that the computing system is permitted to take in order to retrieve a stored value of the step parameter from an information source of the plurality of information sources, and
is applied irrespective of user identity;
determine, based on the access class associated with the step parameter, a subset of the plurality of information sources, that the computing system is permitted to access, wherein
application of the access class prohibits the computing system from retrieving stored values of the step parameter from a remainder of information sources not included in the subset;
identify a minimum authentication level associated with the step parameter;
receive, from the mobile computing device, first information indicative of an identity of a user of the mobile computing device;
identify, based on a public availability of the first information, a current authentication level, the current authentication level being indicative of a level of confidence in the identity of the user indicated by the first information;
determine, that the current authentication level satisfies the minimum authentication level associated with the step parameter;
based on the current authentication level satisfying the minimum authentication level, access, from the subset of the plurality of information sources, a stored entry of the records of previous interactions, the stored entry including a first stored value of step parameter corresponding to the identity of the user;
modify, by providing the first stored value to the dynamic UX application, an application component of the one or more application components; and
provide the modified application component to the mobile computing device.

18. The computing system of claim 17, the instructions further causing the computing system to:
access metadata associated with the workflow; and modify the workflow based at least in part on the metadata.

19. The computing system of claim 17, wherein the instructions further cause the computing system to:
receive a personal information of the user; and
update, based on a public availability of the personal information, the current authentication level.

20. A non-transitory computer-readable medium containing instructions that, when executed, cause a computing device associated with an organization to:
identify a current step of a workflow associated with execution of dynamic user experience (UX) application at a mobile computing device, wherein the current step of the workflow;
requires a step parameter for completion, and
includes one or more application components;
identify a plurality of information sources storing records of previous interactions between a user of the mobile computing device and the organization, the records including a plurality of stored values corresponding to the workflow,
wherein the plurality of information sources includes information sources:
within the organization that are accessible by the computing device via an internal service call, and
outside the organization that are accessible by the computing device via an external service call;
identify an access class associated with the step parameter, wherein the access class:
defines a type of action that the computing device is permitted to take in order to retrieve a stored value of the step parameter from an information source of the plurality of information sources, and
is applied irrespective of user identity;
determine, based on the access class associated with the step parameter, a subset of the plurality of information sources that the computing device is permitted to access, wherein
application of the access class prohibits the computing device from retrieving stored values of the step parameter from a remainder of information sources not included in the subset;
identify a minimum authentication level associated with the step parameter;
receive, from the mobile computing device, first information indicative of an identity of a user of the mobile computing device;
identify, based on a public availability of the first information, a current authentication level, the current authentication level being indicative of a level of confidence in the identity of the user indicated by the first information;
determine, that the current authentication level satisfies the minimum authentication level associated with the step parameter;
based on the current authentication level satisfying the minimum authentication level, access, from the subset of the plurality of information sources, a stored entry of the records of previous interactions, the stored entry including a first stored value of the step parameter corresponding to the identity of the user;
modify, by providing the first stored value to the dynamic UX application, an application component of the one or more application components; and
provide the modified application component to the mobile computing device.

* * * * *